United States Patent
Tjong et al.

(10) Patent No.: US 7,631,031 B2
(45) Date of Patent: *Dec. 8, 2009

(54) POINT-TO-POINT DATA COMMUNICATION IMPLEMENTED WITH MULTIPOINT NETWORK DATA COMMUNICATION COMPONENTS

(75) Inventors: Soemin Tjong, Redmond, WA (US); Larry Morris, Kirkland, WA (US); Glenn Davis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

This patent is subject to a terminal disclaimer.

(21) Appl. No.: 11/027,122

(22) Filed: Dec. 31, 2004

(65) Prior Publication Data

US 2005/0138214 A1 Jun. 23, 2005

Related U.S. Application Data

(62) Division of application No. 09/945,369, filed on Aug. 31, 2001, now Pat. No. 7,213,044.

(51) Int. Cl.
G06F 15/16 (2006.01)
G06F 3/00 (2006.01)
(52) U.S. Cl. .................. 709/200; 709/230; 719/321
(58) Field of Classification Search .......... 709/200, 709/227, 230; 719/321, 324
See application file for complete search history.

(56) References Cited

U.S. PATENT DOCUMENTS

| 6,049,549 | A | 4/2000 | Ganz et al. |
| 6,138,178 | A | 10/2000 | Watanabe |
| 6,157,965 | A | 12/2000 | Mohammed et al. |
| 6,233,619 | B1 | 5/2001 | Narisi et al. |
| 6,377,992 | B1 | 4/2002 | Fernandez et al. |
| 6,633,929 | B1 * | 10/2003 | Hyder et al. ............ 710/62 |
| 6,934,740 | B1 * | 8/2005 | Lawande et al. ........ 709/213 |
| 7,213,044 | B2 | 5/2007 | Tjong |
| 7,305,426 | B2 | 12/2007 | Tjong et al. |
| 2002/0143960 | A1 * | 10/2002 | Goren et al. ............ 709/229 |

* cited by examiner

*Primary Examiner*—Nathan Flynn
*Assistant Examiner*—Joshua Joo

(57) ABSTRACT

A data communication system is configured to communicatively link a host device and a client device with a point-to-point data communication link, where the point-to-point data communication link is configured with multipoint network data communication components designed for data communication over a distributed network. A data communication interface at the host device is communicatively linked with a data communication interface driver via the point-to-point data communication link between the host device and the client device. The data communication interface driver communicates with a virtual driver component for the client device via a virtual network at the client device.

8 Claims, 8 Drawing Sheets

POINT-TO-POINT DATA COMMUNICATION IMPLEMENTED WITH MULTIPOINT NETWORK DATA COMMUNICATION COMPONENTS

RELATED APPLICATIONS

This application is a divisional of and claims priority to U.S. patent application Ser. No. 09/945,369 entitled "Point-to-Point Data Communication Implemented with Multipoint Network Data Communication Components" filed Aug. 31, 2001 to Tjong et al., the disclosure of which is incorporated by reference herein.

TECHNICAL FIELD

This invention relates to communicatively linking computing systems and, in particular, to implementing a point-to-point data communication link between two computing devices with multipoint distributed network data communication components.

BACKGROUND

Computing devices can be communicatively linked with a point-to-point communication connection to enable communication between a client device and a host device, for example. A client device might include a portable laptop computer, a tablet PC, a handheld personal digital assistant (PDA), a cellular phone, and other similar devices that can be configured for direct communication with a host device for synchronized file updates and other data manipulation functions.

FIG. 1 illustrates a conventional point-to-point communication system 100 that includes a host computing device 102 and a client device 104 communicatively linked together with a point-to-point serial connection 106. The host device 102 and the client device 104 each include an application layer 108 and 110, respectively. In this example, applications 108 and 110 can each be a synchronization application designed to facilitate data communication between the host device 102 and the client device 104.

Typically, data communication between computing devices is divided into functional layers between a software application layer, such as application layer 108, and a communication link, such as the point-to-point serial connection 106. Each functional layer provides an appropriately formatted data transfer function to an adjacent functional layer while abstracting the adjacent functional layer from the functional implementation details of a particular layer. Data transfer between the functional communication layers is communicated from higher layers to lower layers, and vice-versa, and by convention, an application layer is a higher layer that communicates information down to a lower layer, such as to a hardware connection interface and/or driver. Accordingly, each functional layer manipulates and formats data as it is communicated from one layer to the next, and reverses the data manipulation and formatting for the data when it is communicated in an opposite direction.

Host computing device 102 includes a transport protocol layer 112 that facilitates information communication between application layer 108 and lower functional communication layers. Implementations of the transport protocol layer 112 can include the Transmission Control Protocol/Internet Protocol (TCP/IP) which is the basic communication protocol for the Internet. TCP/IP can also be used as a communications protocol in a private network, such as an intranet or an extranet. TCP/IP is primarily designed for point-to-point communication, in that communication is from one point, such as from host computing device 102, to another point, such as to client device 104. Point-to-point communication is also commonly designated as "PPP".

The transport protocol layer 112 communicates information to a point-to-point protocol layer 114, which in turn communicates the information to a serial port 116 via a serial port interface 118 and serial port driver 120. The point-to-point protocol layer 114 uses the Internet protocol (IP) and is designed to facilitate information communication between two computing devices via a serial interface. The PPP protocol layer 114 provides the services of a data-link layer and packages TCP/IP packets received from the transport protocol layer 112 and forwards them to the serial port interface 118.

Client device 104 also includes a transport protocol layer 122 that facilitates information communication between application layer 110 and a point-to-point protocol layer 124. The PPP protocol layer 124 communicates the information between the transport protocol layer 122 and a serial port 126 via a serial port interface 130 and serial port driver 132.

The serial port interface 118 and serial port driver 120 at the host computing device 102 support the point-to-point serial connection 106 between serial port 116 at host computing device 102 and serial port 126 at client device 104. The serial connection 106 is one of the most common communication links to implement between two devices. Serial port connections, however, are relatively slow and typically communicate information at a rate of only 115 kilobits per second.

FIG. 2 illustrates a point-to-point communication system 200 that includes a host computing device 202 and a client device 204 communicatively linked with a point-to-point universal serial bus (USB) connection 206. The USB connection 206 is preferable over the serial connection 106 (FIG. 1) because USB supports a data transfer rate of 12 megabits per second which accommodates connecting a wide range of devices to host computing device 202 at a higher data transfer rate.

Host computing device 202 and client device 204 each include an application layer 208 and 210, a transport protocol layer 212 and 214, and a point-to-point protocol layer 216 and 218, respectively. Each of these components are described above with reference to FIG. 1.

Host computing device 202 also includes a virtual serial port driver 220 that communicates information between the point-to-point protocol layer 216 and a USB port 222. The client device 204 also includes a virtual serial port driver 224 that communicates information between the point-to-point protocol layer 218 and a USB port 226. A virtual serial port driver is also commonly known as a USB serial host driver that enables a point-to-point communication link between USB port 222 at host computing device 202 and USB port 226 at client device 204. The virtual serial port driver 220 exposes a standard serial interface in the host computing device 202 to the upper-level application 208 so that the application can communicate data via USB connection 206 as if it were a standard serial port connection.

FIG. 3 illustrates a multipoint data communication system 300 that includes a computing device 302 having multipoint distributed network data communication components. Computing device 302 includes an application layer 304 and a transport protocol layer 306. The transport protocol layer 306 is described above with reference to FIG. 1. The application 304 can be an Internet browser application, for example, that facilitates user interaction with the Internet 308 via a local area network (LAN) 310.

Computing device 302 also includes multipoint network data communication components such as a Network Driver Interface Specification (NDIS) layer 312 and a miniport driver layer 314. The NDIS layer 312 is a network device driver communication protocol layer that specifies how communication protocol layers or programs, such as TCP/IP, and network device drivers communicate with each other. The NDIS layer 312 provides a layer of abstraction for the development of network device drivers. The abstraction includes an application programming interface (API) to functionally identify the services provided by the NDIS layer 312 without requiring that adjacent layers recognize the implementation details for the NDIS layer. This provides a device-independent format for commands and data that are communicated to a network-connected device.

The NDIS layer 312 configures network-connected devices for communication to send and receive network data on behalf of applications executing on computing device 302. The applications, such as application 304, communicate information to the NDIS layer 312 through a transport protocol configured for the type of data exchanged and the underlying network used for transmission of the data, such as via TCP/IP, NetBEUI, NWLINK, or other similar communication protocol layers. The NDIS layer 312 communicates with lower driver layers, such as the bus and/or network interface 316, with NDIS object identifiers (OIDs) to perform network device configuration and data communication management of NDIS data packets.

The NDIS layer 312 supports basic types of network interface card (NIC) drivers which are also referred to as NDIS miniport drivers. The miniport driver layer 314 communicates information with the NDIS layer 312 and communicates with the bus and/or network interface 316 through vendor-specific APIs. The bus and/or network interface 316 is typically bus-specific or network-specific and communicates with network-connected devices through the appropriate bus or network interface. Typically, an NDIS miniport driver is specifically configured for a particular hardware device.

Both the NDIS miniport driver layer 314 and the bus and/or network interface 316 are configured by a manufacturer (OEM) of a network-connected device to communicate via vendor-specific APIs. Thus, the NDIS miniport driver layer 314 conforms to an NDIS layer API to communicate with NDIS layer 312, and the bus and/or network interface 316 conforms to the appropriate bus or network interface to communicate information to a network-connected device, or multiple network-connected devices via the LAN 310.

FIG. 4 illustrates a multipoint data communication system 400 that includes a computing device 402 having multipoint distributed network data communication components. Computing device 402 includes an application layer 404 and a transport protocol layer 406. The transport protocol layer 406 is described above with reference to FIG. 1. Application 404 can be a synchronization application, for example, designed to facilitate data communication between computing device 402 and remote device 408. Application 404 also utilizes remote device 408 to access a LAN 410.

Computing device 402 also includes an NDIS layer 412 and a Remote NDIS miniport driver layer 414. The NDIS layer 412 is described above with reference to FIG. 3. In FIG. 4, the Remote NDIS architecture replaces the NDIS miniport driver layer 314 and the bus and/or network interface 316 of FIG. 3, both of which were provided by a network-connected device manufacturer, with a Remote NDIS miniport driver layer 414 and a bus and/or network-specific microport 416.

Each combination of components provides the computing devices 302 and 402 access to a LAN 310 and 410 respectively.

Remote NDIS miniport driver layer 414 and the bus and/or network-specific microport 416 are independent of any particular network-connected device 408 and can be included as part of the computing device 402 operating system similarly to the transport protocol layer 406 and the NDIS protocol layer 412. With Remote NDIS, hardware manufacturers providing remote devices do not have to provide host-based drivers for their devices. Remote NDIS is the subject of U.S. patent application Ser. No. 09/302,735 entitled "Method and System for Abstracting Network Device Drivers", the disclosure of which is incorporated by reference herein.

Remote NDIS miniport driver layer 414 defines a connection-independent message set along with a description of how the message set operates over a particular connection, such as with a specific bus or network. A Remote NDIS interface is standardized to facilitate a defined set of host drivers to support any number of network-connected devices thereby eliminating the need to install new drivers to support a newly connected network device.

The Remote NDIS miniport driver layer 414 encapsulates NDIS object identifiers (OIDs) and NDIS data packets into data structures known as Remote NDIS messages that can be communicated without modification to a remotely connected device 408. The Remote NDIS miniport driver layer 414 communicates the Remote NDIS messages with the bus and/or network-specific microport driver layer 416 which can include a USB bus microport, a 1394 bus microport, a Bluetooth microport, or any other similar communication protocol microport.

The bus and/or network-specific microport driver layer 416 is an intermediate layer that interfaces with the specific bus or network responsible for communicating the Remote NDIS messages to the remote device 408. The microport driver layer 416 receives Remote NDIS messages and communicates them to a corresponding element of the specific bus or network driver layer. The Remote NDIS messages are communicated via the USB connection to remote device 408.

With the Remote NDIS architecture, the network communication protocol mechanisms are abstracted above the bus and/or network-specific microport driver layer 416. Adding a new network-connected device can be accomplished by changing or modifying only the Remote NDIS miniport driver layer 414. The microport driver layer 416 remains unchanged because it is a message transport layer that passes NDIS layer OIDs and NDIS data packets encapsulated in Remote NDIS messages.

SUMMARY

A data communication system is configured to communicatively link a host device and a client device with a point-to-point data communication link, where the point-to-point data communication link is configured with multipoint network data communication components designed for data communication over a distributed network. A data communication interface at the host device is communicatively linked with a data communication interface driver via the point-to-point data communication link between the host device and the client device.

The data communication interface at the host device can be implemented with the Remote Network Driver Interface Specification (NDIS), and the data communication interface driver is a Remote NDIS driver. The Remote NDIS component communicates Remote NDIS messages with the Remote NDIS driver via the point-to-point data communication link.

The data communication interface driver (e.g., Remote NDIS driver) at the client device communicates with a virtual driver component for the client device via a virtual network. The virtual network can be implemented as a local area network (LAN) and the Remote NDIS driver communicates the Remote NDIS messages with the virtual driver component via the LAN.

The data communication system includes a connection interface to couple the point-to-point data communication link with the client device. The connection interface can be implemented with a Universal Serial Bus data communication interface, a 1394 bus data communication interface, a wireless data communication interface, a Bluetooth data communication interface, an infrared data communication interface, or other similar point-to-point data communication protocol interface.

BRIEF DESCRIPTION OF THE DRAWINGS

The same numbers are used throughout the drawings to reference like features and components.

DETAILED DESCRIPTION

The following describes systems and methods for point-to-point data communication between computing devices implemented with distributed network communication components intended for multipoint data communication. The described point-to-point data communication system utilizes the Network Driver Interface Specification (NDIS) and Remote NDIS communication interface layers that are designed for multipoint data communication over a distributed network. Inherently, NDIS and Remote NDIS are not designed to facilitate point-to-point communication between two computing devices. However, implementing a host computing device's Remote NDIS driver layer in an external client device can be utilized to establish a basic point-to-point data communication link between the two computing devices.

The described point-to-point data communication system is versatile in that a user can communicate with a host computing device configured with Remote NDIS via a point-to-point data communication link from any portable device configured with a Remote NDIS driver layer, a data communication interface for the portable device, and a virtual network coupling the Remote NDIS driver layer and the data communication interface. For example, a user with a PDA can download his or her schedule to any other user's desktop PC by simply establishing a point-to-point communication link between the two devices. The desktop PC does not need to be configured with any specific drivers or interface components to receive the schedule from the PDA. Furthermore, the point-to-point communication link can be a physical USB or 1394 connection, or a wireless Bluetooth or infrared connection, or any other similar communication protocol that can be utilized for a point-to-point communication link.

Figure 5:
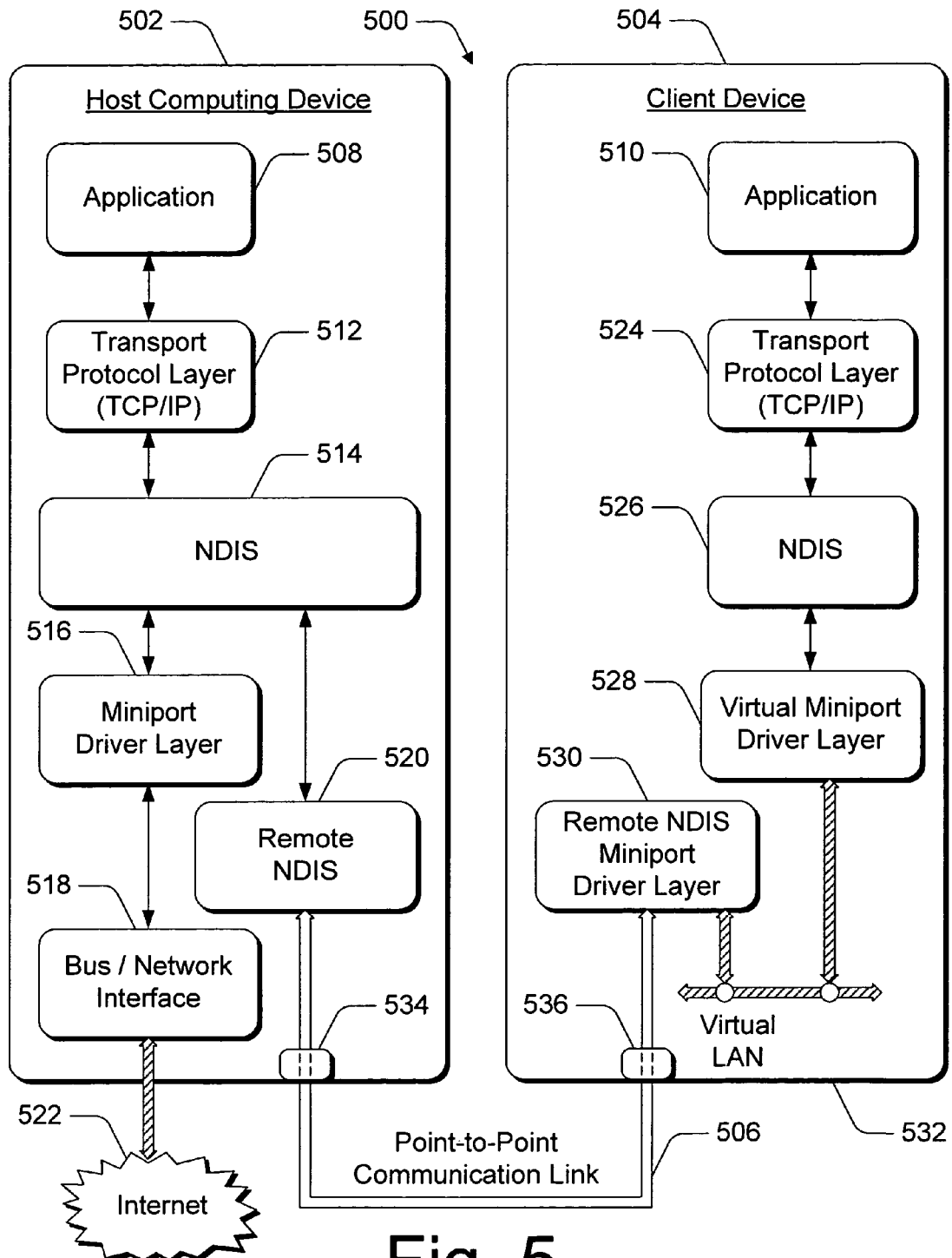
FIG. 5 is a block diagram that illustrates a point-to-point data communication link between two computing devices implemented with multipoint distributed network data communication components.

FIG. 5 illustrates a data communication system 500 having components that can be implemented within a computing device, or the components can be distributed within a computing system having more than one computing device. The communication system 500 includes a host computing device 502 and a client device 504 communicatively linked with a point-to-point data communication link 506. See the description of "Exemplary Computing System and Environment" below for specific examples and implementations of networks, computing systems, computing devices, and components that can be used to implement the invention described herein.

The host computing device 502 and the client device 504 each include multipoint distributed network data communication components designed to connect a computing device to a network, such as a LAN, and to communicatively link the computing device with remote network-connected devices. The host computing device 502 and the client device 504 each include an application layer 508 and 510, respectively. For example, the applications 508 and 510 can each be a synchronization application designed to facilitate data communication between the host computing device 502 and the client device 504.

Host computing device 502 includes a transport protocol layer 512 that enables data communication between application layer 508 and other data communication layers in the host computing device. The transport protocol layer 512 can be implemented with the Transmission Control Protocol/Internet Protocol (TCP/IP) which is a communications protocol that enables data communication between layers in the host computing device 502.

Host computing device 502 also includes an NDIS layer 514, a miniport driver layer 516, a bus and/or network interface 518, and a Remote NDIS layer 520. The NDIS layer 514 is a network device driver communication protocol layer that specifies how the transport protocol layer 512 and the bus and/or network interface 518 communicate information with each other. The miniport driver layer 516 communicates information with the NDIS layer 514 and communicates with the bus and/or network interface 518. The bus and/or network interface 518 communicates with remote network-connected devices via the Internet 522 through a network connection.

Client device 504 includes a transport protocol layer 524, an NDIS layer 526, and a virtual miniport driver layer 528. The virtual miniport driver layer 528 communicates information between the NDIS layer 526 and a Remote NDIS miniport driver layer 530. A virtual LAN 532 communicates data between the virtual miniport driver layer 528 and the Remote NDIS miniport driver layer 530.

Figure 1:
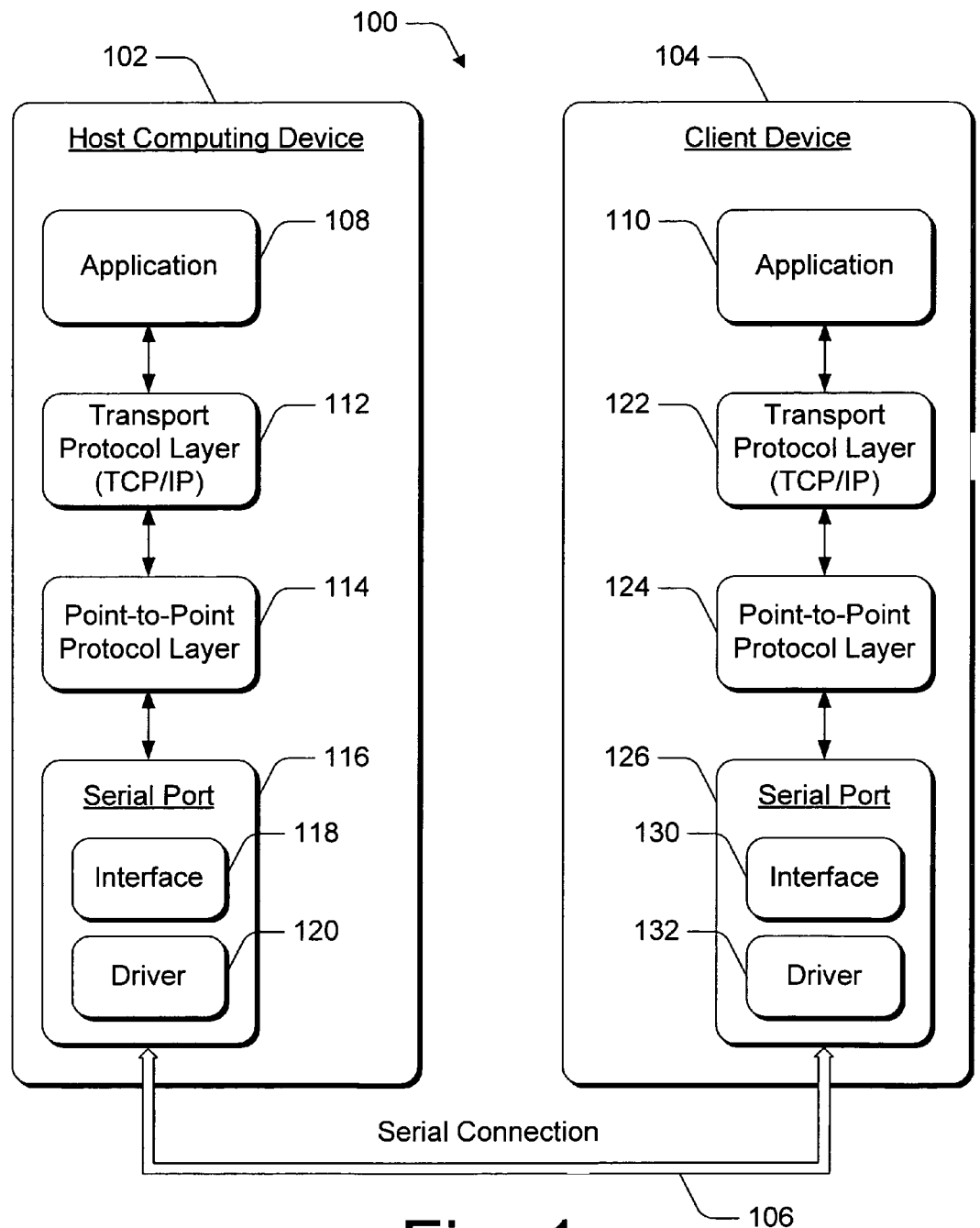
FIG. 1 is a block diagram that illustrates communicatively linking two computing devices with a conventional point-to-point serial connection.
Figure 2:
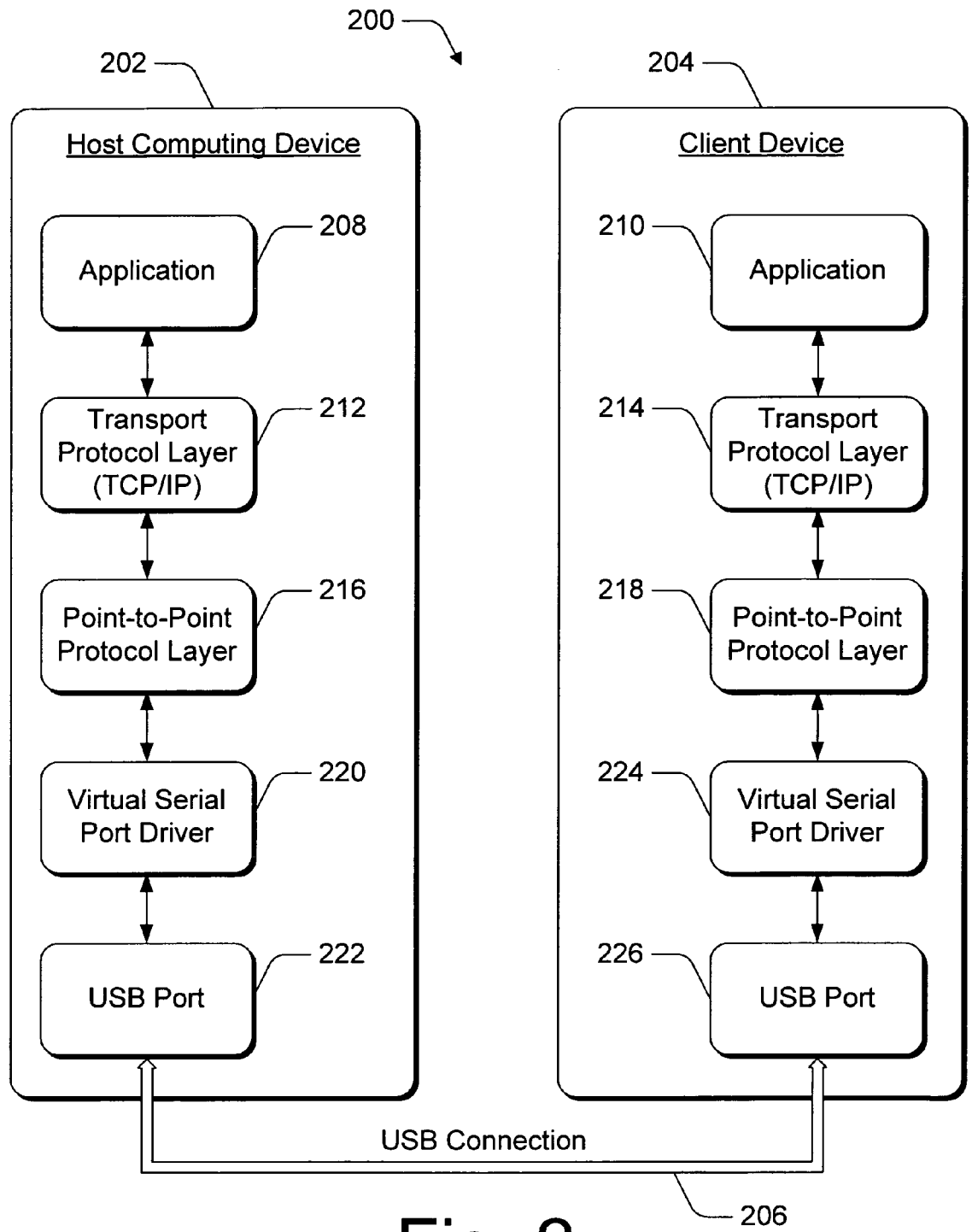
FIG. 2 is a block diagram that illustrates communicatively linking two computing devices with a conventional point-to-point USB connection.
Figure 3:
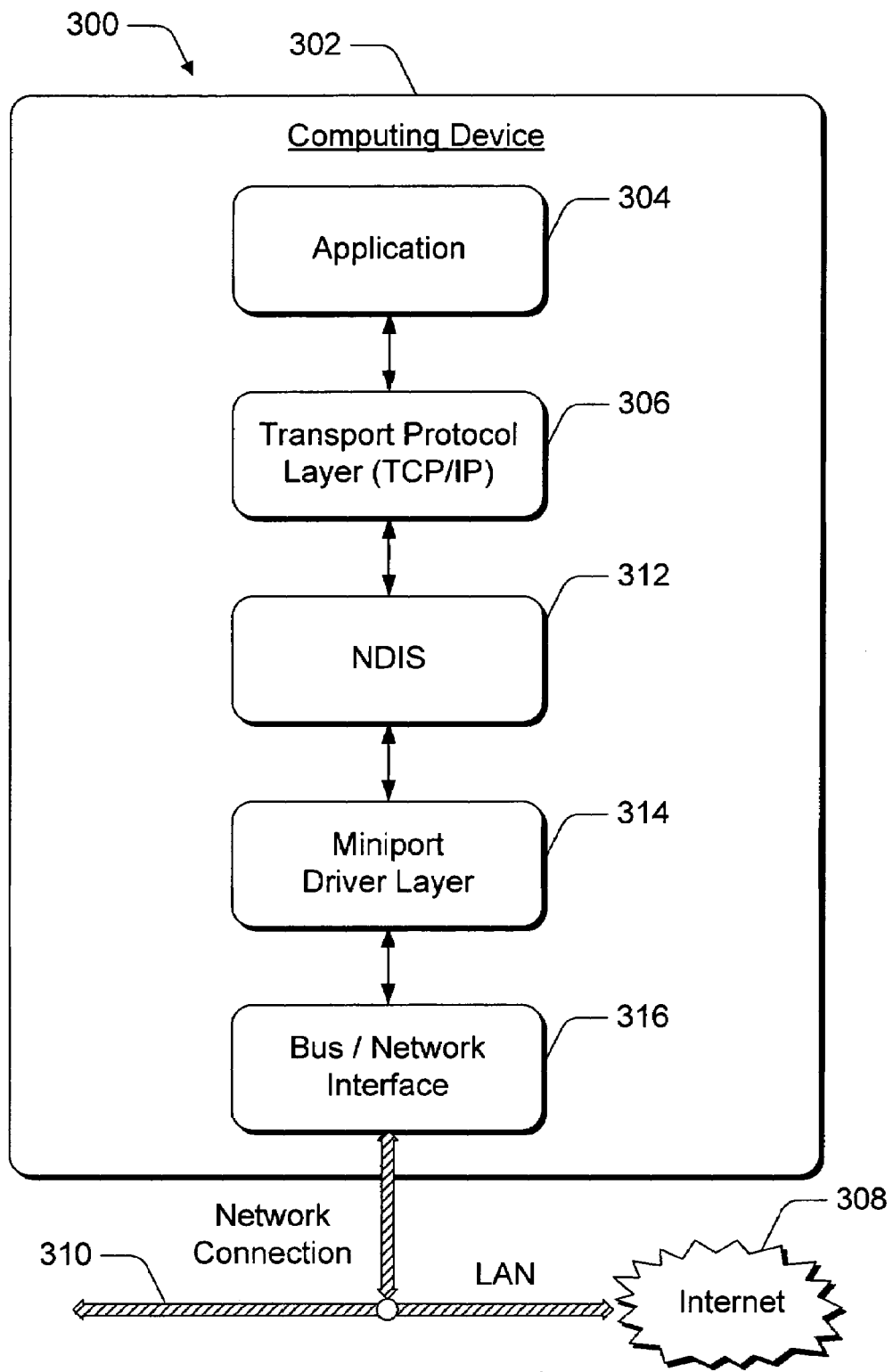
FIG. 3 is a block diagram that illustrates a computing device having conventional multipoint distributed network data communication components.
Figure 4:
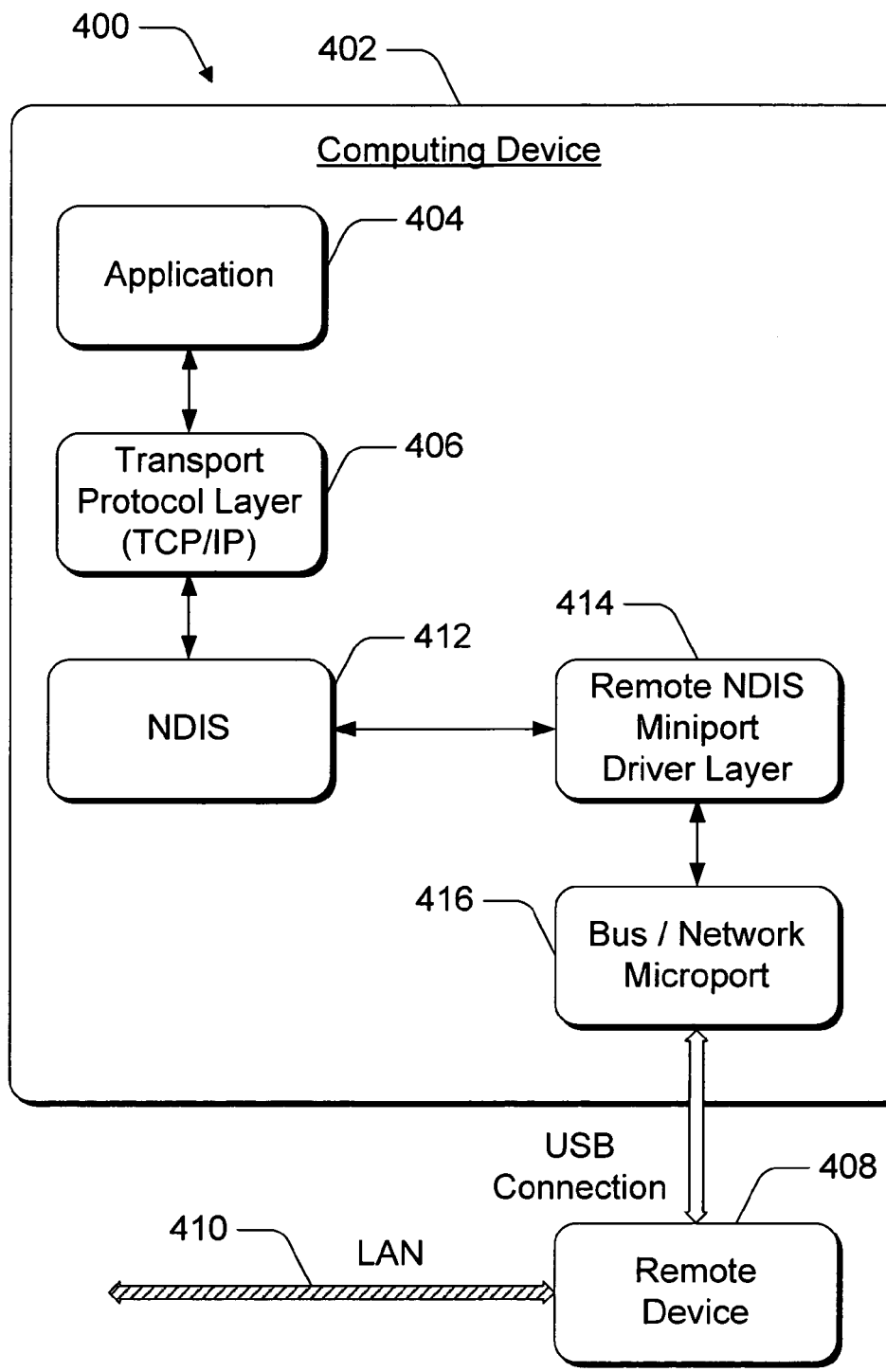
FIG. 4 is a block diagram that illustrates a computing device having conventional multipoint distributed network data communication components configured to communicatively link with network-connected remote devices.

Virtual LAN 532 is defined to appear as a multipoint distributed network to the Remote NDIS miniport driver layer 530 just as LAN 410 appears to the Remote NDIS miniport driver layer 416 in FIG. 4. Instead of the Remote NDIS messages being communicated out to the LAN 410 from the Remote NDIS miniport driver layer 416 in FIG. 4, however, Remote NDIS messages from the Remote NDIS miniport driver layer 530 are routed for use within client device 504 via the virtual LAN 532. Virtual LAN 532 is referred to as "virtual" because there is no corresponding underlying hardware used to establish and maintain the communication path between the virtual miniport driver layer 528 and the Remote NDIS miniport driver layer 530.

The host computing device Remote NDIS layer 520 communicates with NDIS layer 514 and enables the point-to-point communication link 506 between host computing device 502 and client device 504. The Remote NDIS miniport driver layer 530 communicates Remote NDIS messages between the Remote NDIS layer 520 and the virtual LAN 532 in client device 504. The Remote NDIS architecture illustrated in FIG. 5 configures the client device 504 with the Remote NDIS miniport driver layer 530 which enables the point-to-point communication link 506 between the host computing device 502 and the client device 504.

Host computing device 502 includes a connection interface 534 that couples the point-to-point communication link 506 with a connection interface 536 at client device 504. The connection interfaces 534 and 536 can be implemented as hardware, software, or both to enable a physical USB or 1394 connection, a wireless Bluetooth or infrared connection, or any other similar point-to-point communication protocol supported by the Remote NDIS architecture.

The client device Remote NDIS miniport driver layer 530 communicates Remote NDIS messages to the virtual LAN 532, which are then communicated to the virtual miniport driver layer 528. The Remote NDIS messages can be communicated to the virtual miniport driver layer 528 from the Remote NDIS miniport driver layer 530 by utilizing medium access controller (MAC) addressing such that the client device 504 passes the Remote NDIS messages to itself from the Remote NDIS miniport driver layer 530 to the virtual miniport driver layer 528. The virtual miniport driver layer 528 is a data communication interface for the particular client device 504 and converts the Remote NDIS messages received via the virtual LAN 532 to NDIS data packets.

Implementing the host computing device's Remote NDIS miniport driver layer 530 in an external device (i.e., the client device 504), instead of in the host computing device 502, facilitates a point-to-point communication link between the two devices without having to configure the host computing device with interface components to communicate with the external device. The host computing device 502 can be communicatively linked with any mobile client device, such as a portable laptop computer, a tablet PC, a handheld PDA, a cellular phone, and similar items, without having driver(s) for a particular device installed on host computing device 502.

Additionally, the Remote NDIS architecture illustrated in FIG. 5 facilitates client device 504 utilizing the host computing device 502 as a gateway to the Internet 522 via the point-to-point data communication link 506 between the client device 504 and the host computing device 502. The point-to-point communication link 506 can be a USB or 1394 connection, a Bluetooth wireless connection, or any other similar communication protocol supported by the Remote NDIS architecture.

Figure 6:
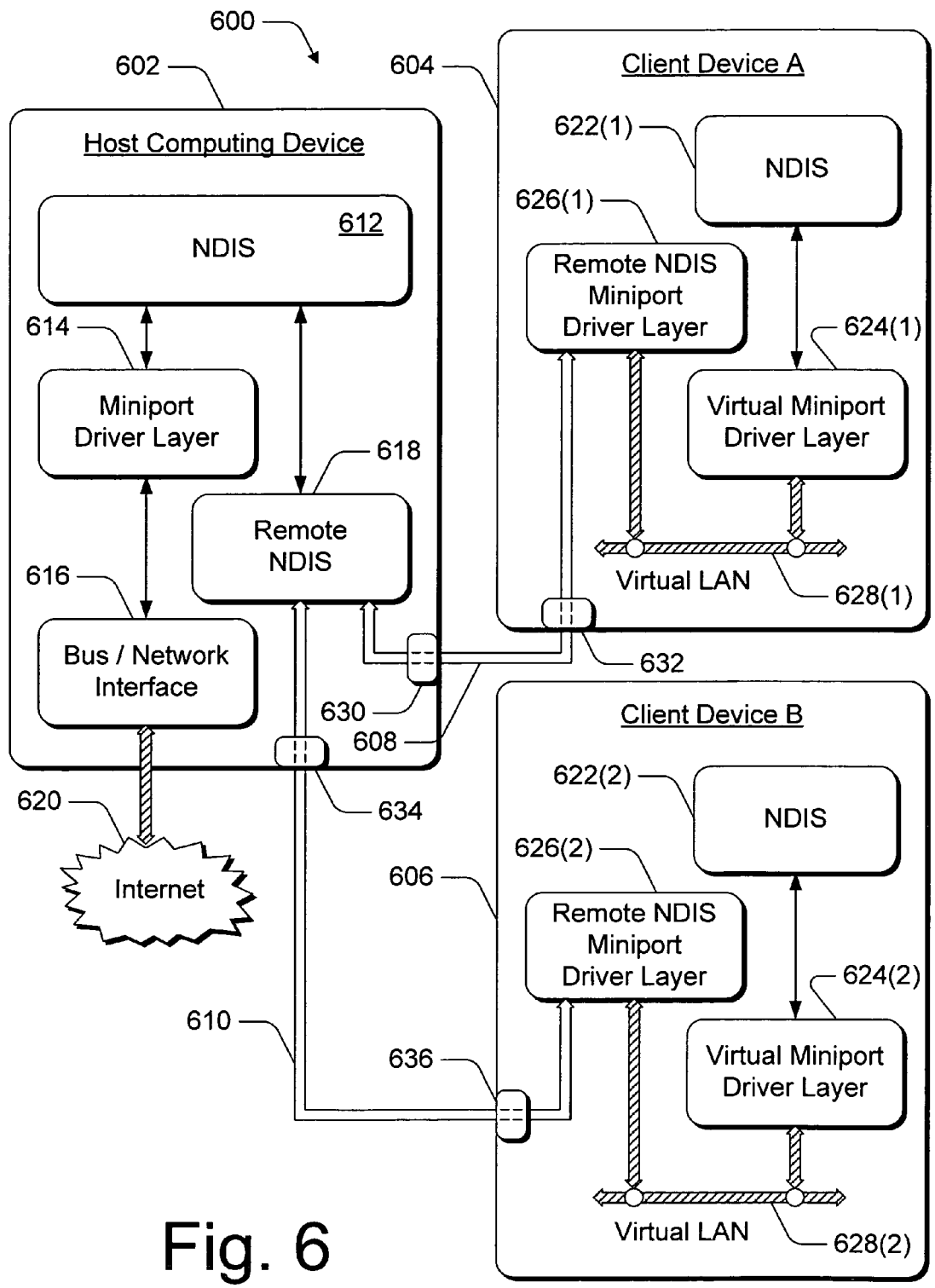
FIG. 6 is a block diagram that illustrates point-to-point data communication links between a host computing device and multiple client devices, each configured with multipoint distributed network data communication components.

FIG. 6 illustrates a data communication system 600 that includes a host computing device 602 communicatively linked with a first client device 604 via a point-to-point data communication link 608 and communicatively linked with a second client device 606 via a point-to-point data communication link 610. Host computing device 602 and client devices 604 and 606 each include multipoint distributed network data communication components designed to connect a computing device to a distributed network, and to communicatively link the computing device with remote network-connected devices.

Although not shown, host computing device 602 and client devices 604 and 606 can each include an application layer and a transport protocol layer that enables information communication between the application layer and other communication layers in each respective device. Application and transport protocol layers are described above with reference to FIG. 5.

Host computing device 602 also includes an NDIS layer 612, a miniport driver layer 614, a bus and/or network interface 616, and a Remote NDIS layer 618. The miniport driver layer 614 communicates information with the NDIS layer 612 and communicates with the bus and/or network interface 616. The bus and/or network interface 616 communicates with remote network devices connected via the Internet 620 through a network connection.

Client devices 604 and 606 each include an NDIS layer 622, a virtual miniport driver layer 624, and a Remote NDIS miniport driver layer 626. A virtual miniport driver layer 624 communicates information between an NDIS layer 622 and a Remote NDIS miniport driver layer 626. A virtual LAN 628 communicates data between the virtual miniport driver layer 624 and the Remote NDIS miniport driver layer 626.

The host computing device Remote NDIS layer 618 enables the point-to-point data communication link 608 with client device 604 and the point-to-point data communication link 610 with client device 606. Remote NDIS miniport driver layer 626(1) communicates Remote NDIS messages via virtual LAN 628(1) to the virtual miniport driver layer 624(1) in client device 604. Similarly, Remote NDIS miniport driver layer 626(2) communicates Remote NDIS messages via virtual LAN 628(2) to the virtual miniport driver layer 624(2) in client device 606.

Data communication system 600 implements the host computing device's Remote NDIS miniport driver layer 626 in an external device, or devices (i.e., client devices 604 and 606), instead of in the host computing device 602. In this example, host computing device 602 can be communicatively linked with any number of mobile client devices, such as a portable laptop computer, a tablet PC, a handheld PDA, a cellular phone, and similar items, without having driver(s) for a particular device installed on host computing device 602.

The point-to-point data communication link 608 between host computing device 602 and external client device 604, and the point-to-point data communication link 610 between host computing device 602 and external client device 606, can be a USB or 1394 connection, a Bluetooth or infrared wireless connection, or any other similar communication protocol supported by the Remote NDIS architecture.

Data communication system 600 also illustrates that multipoint distributed network data communication components can be configured to implement secure point-to-point data communication links between a host computing device and multiple client devices without actually implementing a multipoint network. For example, host computing device 602 can include a first connection interface 630 that couples the point-to-point data communication link 608 with a connection interface 632 at client device 604, and a second connection interface 634 that couples the point-to-point data communication link 610 with a connection interface 636 at client device 606. Both client devices 604 and 606 can receive the same Remote NDIS message from the Remote NDIS layer 618 in host computing device 602 via an independent point-to-point data communication link and without being network connected to the host computing device 602.

Figure 7:
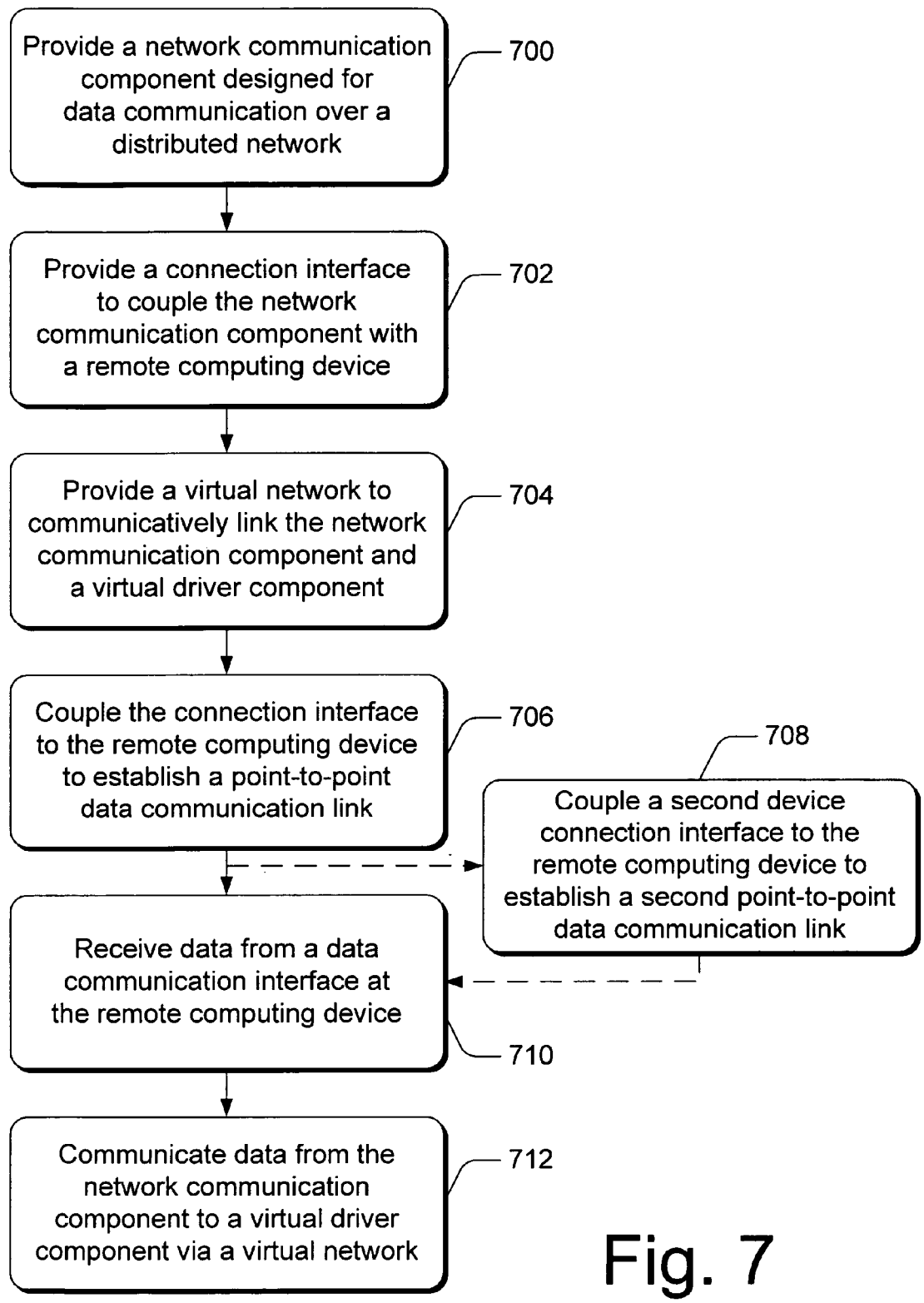
FIG. 7 is a flow diagram of a method for implementing a point-to-point data communication link between computing devices configured with multipoint distributed network data communication components.

FIG. 7 illustrates a method for implementing a point-to-point data communication link between computing devices with multipoint distributed network data communication components, and communicating data between a host device and a client device. The order in which the method is described is not intended to be construed as a limitation. Furthermore, the method can be implemented in any suitable hardware, software, firmware, or combination thereof.

At block 700, a network communication component designed for data communication over a distributed network is provided. For example, a data communication interface driver is provided with a client device such as the Remote NDIS miniport driver layer 530 (FIG. 5). The data communication interface driver is configured to communicatively link with a data communication interface of a host computing device via a point-to-point data communication link. For example, the Remote NDIS miniport driver layer 530 is communicatively linked with the Remote NDIS component 520 at host computing device 502 via the point-to-point communication link 506.

At block 702, a connection interface is provided to couple the network communication component with a remote host computing device. For example, connection interface 536 couples the point-to-point communication link 506 with client device 504. The connection interface can be implemented as hardware, software, or both to enable a physical USB or 1394 connection, a wireless Bluetooth or infrared connection, or any other similar point-to-point communication protocol supported by the data communication interface (e.g., the Remote NDIS architecture).

At block 704, a virtual network is provided to communicatively link the network communication component and a virtual driver component of a client computing device. For example, virtual LAN 532 communicatively links the Remote NDIS miniport driver layer 530 and the virtual miniport driver layer 528 at client device 504.

At block 706, the client device connection interface is coupled to the host device to establish the point-to-point data communication link. Alternatively, at block 708, a second client device connection interface is coupled to the host device to establish a second point-to-point data communication link. For example, connection interface 636 (FIG. 6) couples a second client device 606 to host computing device 602 via a second point-to-point data communication link 610.

At block 710, data is received from the remotely located data communication interface. For example, Remote NDIS messages are received from the Remote NDIS component 520 at host computing device 502 via the point-to-point data communication link 506 and connection interface 536. Additionally, for the second client device, the Remote NDIS messages are received from the Remote NDIS component 520 at host computing device 502 via the second point-to-point data communication link and second client device connection interface.

At block 712, the data is communicated from the data communication interface driver (i.e., the network communication component) to a virtual driver component for the client device via a virtual network. For example, the Remote NDIS messages are received at the Remote NDIS miniport driver layer 530 and communicated to the virtual miniport driver layer 528 via virtual LAN 532.

Figure 8:
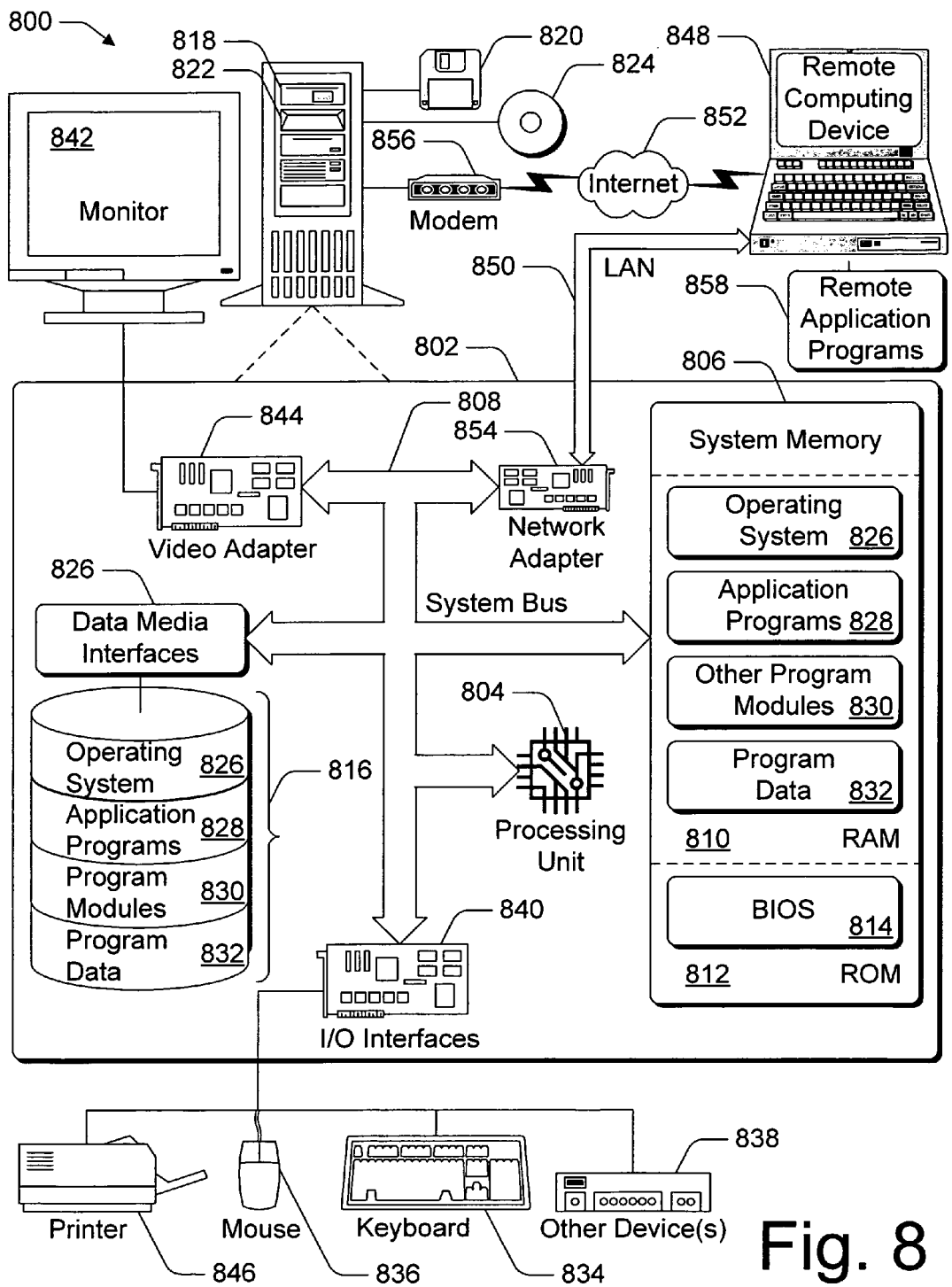
FIG. 8 is a diagram of computing systems, devices, and components in an environment that can be used to implement the invention described herein.

FIG. 8 illustrates an example of a computing environment 800 within which the computer, network, and system architectures described herein can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, mini-computers, mainframe computers, gaming consoles, distributed computing environments that include any of the above systems or devices, and the like.

Implementing a point-to-point data communication link with multipoint distributed network data communication components may be described in the general context of computer-executable instructions, such as program modules, being executed by a computer. Generally, program modules include routines, programs, objects, components, data structures, etc. that perform particular tasks or implement particular abstract data types. Implementing a point-to-point data communication link with multipoint distributed network data communication components may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing system in the form of a computer 802. The components of computer 802 can include, by are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a point-to-point data communication link implemented with multipoint distributed network data communication components.

Computer system 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

Technological advances have enabled better and more adaptable networking components and devices to meet the needs of consumers requiring sophisticated networking solutions. The systems and methods described herein provide a versatile point-to-point data communication technique that can be implemented with the distributed networking components designed for multipoint data communications.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A data communication system configured to communicatively link computing devices with a point-to-point data communication link, the data communication system comprising:
   a computing system including at least a memory and a processor configured to implement multipoint network data communication components designed for data communication over a distributed network, the multipoint network data communication components being implemented for point-to-point data communication comprising:
- a Remote Network Driver Interface Specification (NDIS) component implemented in a host device and configured to communicate Remote NDIS messages to a remote client device;
- a Remote NDIS driver of the host device that is implemented in the remote client device and configured to receive the Remote NDIS messages from the Remote NDIS component in the host device, the Remote NDIS driver that is implemented in the remote client device further configured to communicate the Remote NDIS messages to a virtual driver component via a virtual local network implemented in the remote client device; and
- a connection interface configured to couple the Remote NDIS component of the multipoint network data communication components with the remote computing device for the point-to-point data communication of the Remote NDIS messages to the remote computing device.

2. A data communication system as recited in claim 1, wherein the multipoint network data communication components include a data communication interface driver configured to communicatively link with a data communication interface of the remote computing device via the point-to-point data communication link.

3. A data communication system as recited in claim 1, wherein the connection interface is a point-to-point data communication protocol interface.

4. A data communication system as recited in claim 1, wherein the connection interface is a Universal Serial Bus data communication interface.

5. A data communication system as recited in claim 1, wherein the connection interface is a 1394 bus data communication interface.

6. A data communication system as recited in claim 1, wherein the connection interface is a wireless data communication interface.

7. A data communication system as recited in claim 1, wherein the connection interface is a Bluetooth data communication interface.

8. A data communication system as recited in claim 1, wherein the connection interface is an infrared data communication interface.

* * * * *